Figure 1:
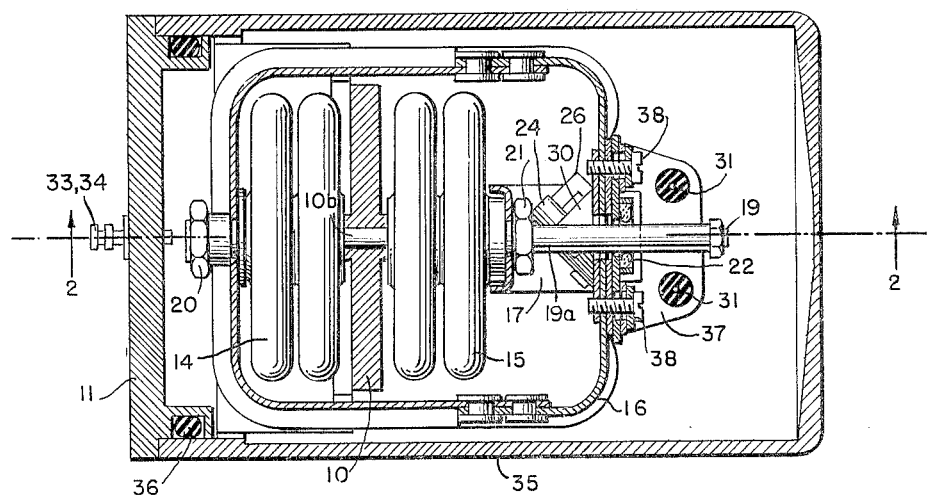

Nov. 16, 1965  J. L. JONKE  3,218,593

ELECTRIC FLUID-PRESSURE TRANSDUCER

Filed Jan. 2, 1962

3,218,593
ELECTRIC FLUID-PRESSURE TRANSDUCER
Joseph L. Jonke, Bethpage, N.Y., assignor to Fairchild Camera and Instrument Corporation, a corporation of Delaware
Filed Jan. 2, 1962, Ser. No. 163,660
3 Claims. (Cl. 338—41)

This invention relates to fluid-pressure transducers and, while it is of general application, it is particularly suitable for embodiment in such a transducer for adjusting the contact of an electrical potentiometer and will be described in such an embodiment.

Heretofore, there have been devised many fluid-pressure transducers for operating control devices such as potentiometers. However, these prior transducers have had a number of disadvantages when designed to respond to relatively low absolute or differential pressures, particularly when utilized in an environment subject to large acceleration forces, such as the measurement of barometric pressure in high-speed planes. For example, pressure transducers for such applications have customarily comprised a single pressure-deflectable element such as a capsule or diaphragm of fairly rugged construction to withstand acceleration forces and, when measuring relatively low pressures, the amount of deflection has been necessarily limited. Therefore, in order to obtain an adequate range of control from the control potentiometer, it has been the practice to interpose motion-multiplying gears, linkages, or the like, but these elements introduce unavoidable errors such as friction in the motion-multiplying mechanism as well as the effect of acceleration forces on them. Moreover, it has been found that acceleration forces acting on the pressure-deflectable element itself introduce errors into the system.

It is an object of the invention, therefore, to provide a new and improved fluid-pressure transducer which obviates one or more of the above-mentioned disadvantages of the prior art devices.

It is another object of the invention to provide a new and improved fluid-pressure transducer capable of operating satisfactorily at relatively low pressures while substantially eliminating errors due to friction of the moving parts and to the effects of accelerating forces.

In accordance with the invention, there is provided a fluid-pressure transducer comprising a support, a fluid-pressure inlet, a pair of pressure-deflectable elements having fluid connections to the inlet, mounted on the support and disposed to deflect in opposite senses relative thereto upon the application of fluid pressure, a control element directly and positively secured to each of the deflectable elements, and means for utilizing the relative displacements of the control elements for developing an output effect.

For a better understanding of the present invention, together with other and further objects thereof, reference is had to the following description, taken in connection with the accompanying drawing, while its scope will be pointed out in the appended claims.

Figure 2:
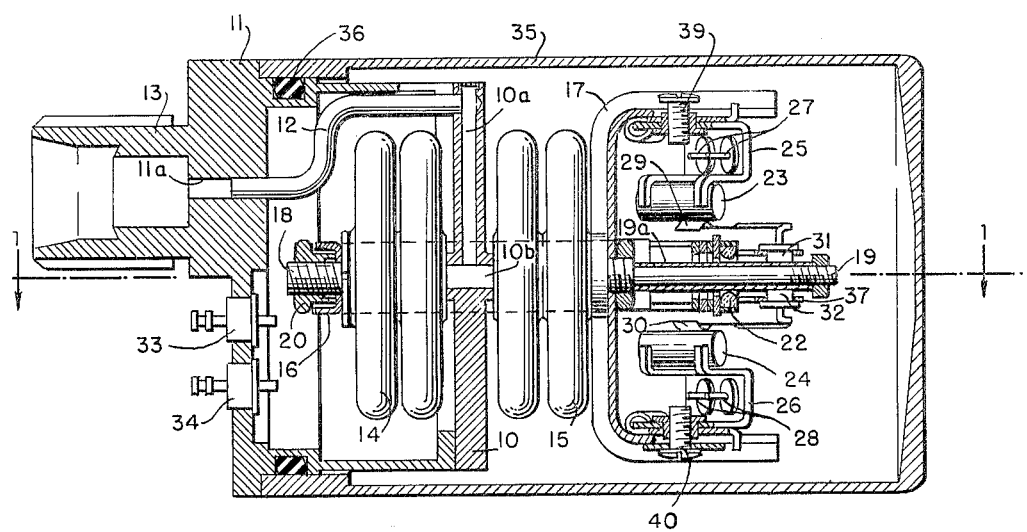

Referring to the drawing:

FIG. 1 is a longitudinal sectional view of a fluid-pressure transducer embodying the invention taken along the lines 1—1 of FIG. 2, while FIG. 2 is a longitudinal view partly in section, taken along the lines 2—2 of FIG. 1.

Referring more specifically to the drawing, there is illustrated a fluid-pressure transducer embodying the invention comprising a support and a fluid inlet. The support may be in the form of a supporting plate 10 secured in any suitable fashion to a cup-shaped base member 11. The plate 10 has a laterally extending fluid conduit 10a terminating in a transverse conduit 10b extending to opposed surfaces of the plate 10. The outer end of conduit 10a is connected by a pipe 12 to a bore 11a in the base 11, terminating in a fluid coupling 13 for connection to an external fluid system.

The transducer of the invention further comprises a pair of pressure-deflectable elements, such as the capsules 14, 15, having fluid connections to the fluid inlet 13 by way of conduits 10a, 10b and pipe 12. The capsules 14, 15 are mounted on the plate 10 and disposed to deflect in opposite senses relative thereto upon the application of fluid pressure to the inlet 13. Preferably, the capsules 14, 15 are mounted on opposite faces of the plate 10 and directly over the ends of the fluid conduit 10b to make fluid connection with opposite ends thereof.

The transducer further includes a pair of control elements, such as the actuating yokes 16 and 17 of channel-shaped cross-section, directly and positively secured to the pressure capsules 14 and 15, respectively. The yokes 16 and 17 are secured to the capsules 14, 15 in any conventional manner as by means of the studs 18 and 19, secured directly to the capsules 14, 15 as by welding or brazing, and lock nuts 20 and 21, respectively, the stud 19 being surrounded by a sleeve 19a. The yokes 16 and 17 are coaxial and extend in the same direction, that is, from left to right as shown in the drawing, and are disposed angularly by 90° relative to their common axis. The stud 19 is preferably in the form of an elongated guide rod which extends from the base of the yoke 17 while an anti-friction bearing, such as a jewel bearing 22, is supported from the other yoke 16 and engages the stud 19.

The fluid-pressure transducer of the invention further comprises means for utilizing the relative displacement of the yokes 16 and 17 for developing a control effect. This means preferably is in the form of a pair of elongated electrical impedances or resistance elements 23, 24 supported on brackets 25, 26 and having insulated terminals 27, 28, respectively, and secured to bracket 17 by screws 39, 40, respectively. Mounted on the other yoke 16 is a pair of elongated contact elements 29 and 30 disposed to cooperate with, that is, make an angular sliding contact with, the resistance elements 23 and 24, respectively, at an angle less than 45° relative to a plane normal to an axial plane of the capsules 14, 15, whereby relative movement between the contact elements and the resistance elements is greater than that between the actuating yokes. The contacts 29 and 30 are supported from the yoke 16 by means of insulators 31 and 32, respectively, mounted in a bracket 37 secured to yoke 16 by screws 38. The wires for connecting with the terminals 27, 28 and the contact elements 29, 30 (not shown) may be carried down the channel of the yoke 16 for connection to a number of external terminals such as the terminals 33, 34. For clarity, the elements 23 to 30, inclusive, are shown in plan view rather than in section in FIG. 2.

The pressure transducer described may be encased in an enclosing housing 35 sealed to the base member 11 by means of a gasket 36. If the device is to be utilized to respond to absolute pressure, the casing 35 may be hermetically sealed to the base 11 and the fluid pressure to be sensed applied to the inlet 13. If it is desired to respond to a differential fluid pressure, a fluid connection (not shown) may be made to the casing 35 so that the two fluid pressures may be applied to the inlet 13 and the casing 35, respectively.

It is believed that the operation of the transducer of the invention will be clear from the foregoing description. Briefly, it may be assumed that the transducer is to respond to an absolute fluid pressure applied to the inlet 13 so that the casing 35 is sealed to the base 11. If the absolute pressure increases, the capsules 14 and 15 deflect in opposite senses so that the relative axial movement between the contacts 29, 30 and their respective resistance elements 23, 24 is the sum of the deflections of the capsules or the difference between their deflections when measured in a given direction. Due to this fact and to the angular mounting of the resistance elements 23, 24, the absolute relative movement between the contacts 29, 30 and their respective resistance elements 23, 24 is multiplied several fold, depending upon the angularity of mounting of the elements 23, 24, and this motion multiplication is accomplished without any motion-multiplying mechanism. This, of course, results in a commensurate multiplication of the variation of the resistance appearing at the terminals 33, 34 connected to any suitable electrical measuring circuit.

Obviously, if the absolute fluid pressure applied to the inlet 13 decreases, similar actions take place but in an opposite sense. It is also obvious that, if desired, the transducer may respond to a differential pressure rather than to an absolute pressure, as described above, the two fluid pressures, to the difference of which the transducer is to respond, being applied to the inlet 13 and to the casing 35. The operation of the transducer per se is the same whether it responds to an absolute or a differential pressure.

The transducer, as described, is unresponsive to acceleration forces normal to the axis of the capsules 14, 15. If acceleration forces have any axial component, however, their action is to increase the deflection of one capsule and, correspondingly, to decrease the deflection of the other. Since the relative movement of the contacts 29, 30 and their respective resistance elements 23, 24 varies with the difference in the deflections of the two capsules in a given sense, deflections of the capsules due to such axial components of acceleration forces are in the same sense so that they cancel out with respect to their effect on the contacts 29, 30 and their respective resistance elements 23, 24.

Thus, it is seen that the fluid-pressure transducer described has a number of advantageous characteristics not found in prior devices of this type:

(1) A direct and positive drive of the contact element and the resistance element without the interposition of any motion-multiplying mechanism which tends to introduce friction into the device.

(2) Substantial elimination of the effect of acceleration forces. Any such force has equal and opposite effects on the capsules 14 and 15 and their associated control elements.

(3) Angular wiping between the resistance elements 23, 24 and their contacts 29, 30, respectively, minimizing electrical noise and multiplying the relative motion therebetween.

(4) Structural rigidity based on the telescoping yokes interconnected through a single precision slide bearing.

While there has been described what is, at present, considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:
1. A fluid-pressure transducer comprising:
 (a) a support;
 (b) a fluid-pressure inlet;
 (c) a pair of pressure-deflectable elements having fluid connections to said inlet, mounted on said support and disposed to deflect in opposite senses relative thereto upon the application of fluid pressure;
 (d) an actuating yoke directly and positively secured to each of said deflectable elements;
 (e) said yokes being coaxial with said deflectable elements and with each other, extending in the same direction, and displaced angularly relative to each other about their common axis;
 (f) and means actuated by said yokes for utilizing the relative displacements of said yokes for developing an output effect.

2. A fluid-pressure transducer comprising:
 (a) a support;
 (b) a fluid-pressure inlet;
 (c) a pair of pressure-deflectable elements having fluid connections to said inlet, mounted on said support and disposed to deflect in opposite senses relative thereto upon the application of fluid pressure;
 (d) an actuating yoke directly and positively secured to each of said deflectable elements;
 (e) said yokes being coaxial with said deflectable elements and with each other, extending in the same direction, and displaced angularly relative to each other about their common axis;
 (f) an anti-friction guide bearing for one of said yokes supported on the other;
 (g) and means actuated by said yokes for utilizing the relative displacements of said yokes for developing an output effect.

3. A fluid-pressure transducer comprising:
 (a) a support;
 (b) a fluid-pressure inlet;
 (c) a pair of pressure-deflectable elements having fluid connections to said inlet, mounted on said support and disposed to deflect in opposite senses relative thereto upon the application of fluid pressure;
 (d) an actuating yoke directly and positively secured to each of said deflectable elements;
 (e) said yokes being coaxial with said deflectable elements and with each other, extending in the same direction, and displaced angularly relative to each other about their common axis;
 (f) an elongated slide extending from the base of one of said yokes;
 (g) an anti-friction slide bearing mounted on the other of said yokes and engaging said slide;
 (h) and means actuated by said yokes for utilizing the relative displacements of said yokes for developing an output effect.

References Cited by the Examiner
UNITED STATES PATENTS

| | | | |
|---|---|---|---|
| 1,398,792 | 11/1921 | Paulin | 338—41 |
| 1,780,179 | 11/1930 | Elliott et al. | 200—83 |
| 2,349,982 | 5/1944 | Murray-Waller | 200—83 X |
| 2,379,291 | 6/1945 | Glass | 92—48 |
| 2,479,616 | 8/1949 | Hasselhorn | 200—83 X |
| 2,622,177 | 12/1952 | Klose | 338—41 X |
| 2,789,190 | 4/1957 | Statham | 73—398 X |
| 2,889,527 | 6/1959 | Statham | 338—41 X |
| 2,909,062 | 10/1959 | Curtis et al. | 338—41 X |
| 2,946,031 | 7/1960 | Steele | 338—42 |
| 2,956,252 | 10/1960 | Boode et al. | 338—42 |

RICHARD M. WOOD, Primary Examiner.